(12) United States Patent
Baldwin (10) Patent No.: US 9,392,085 B2
(45) Date of Patent: Jul. 12, 2016

(54) CHARGING A MOBILE DEVICE HAVING A FLEXIBLE DISPLAY

(71) Applicant: AT&T Intellectual Property I, L.P., Atlanta, GA (US)

(72) Inventor: Christopher Baldwin, Algonquin, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 502 days.

(21) Appl. No.: 13/889,659

(22) Filed: May 8, 2013

(65) Prior Publication Data

US 2014/0334076 A1 Nov. 13, 2014

(51) Int. Cl.
*H02J 7/00* (2006.01)
*H04M 1/02* (2006.01)
*H02J 7/32* (2006.01)

(52) U.S. Cl.
CPC ............ *H04M 1/0268* (2013.01); *H02J 7/0044* (2013.01); *H02J 7/32* (2013.01); *H02J 2007/0096* (2013.01); *Y02B 40/90* (2013.01)

(58) Field of Classification Search
None
See application file for complete search history.

(56) References Cited

U.S. PATENT DOCUMENTS

2006/0020469 A1 1/2006 Rast
2011/0254877 A1 10/2011 Mowry et al.

OTHER PUBLICATIONS

Author Unknown, Flex Your Chatter With Flexible Display Cellphone Concepts, Feb. 6, 2012, Retrieved from the Internet: http://www.designbuzz.com/flex-chatter-flexible-display-cellphone-concepts/, 7 pages.
Peter Murray, Buttons Morph Out of Your Touchscreen With Tactus, Jun. 5, 2012, Retrieved from the Internet: http://singularityhub.com/2012/06/05/buttons-morph-out-of-your-touchscreen-with-tactus/#13639612536201&25447::resize_frame|0-0, 6 pages.
Kwi-Il Park et al., Piezoelectric BaTiO3 Thin Film Nanogenerator on Plastic Substrates, Nano Letters,2010 American Chemical Society, Published on Web: Nov. 4, 2010, 13 pages.

*Primary Examiner* — Jared Fureman
*Assistant Examiner* — Aqeel Bukhari
(74) *Attorney, Agent, or Firm* — Cantor Colburn LLP (57) ABSTRACT

A mobile device includes a housing; a flexible display positioned in the housing; an actuator coupled to the flexible display; an energy generation device coupled to the flexible display; a battery to receive current from the energy generation device in a charging mode; a processor; and a computer readable medium with computer-executable instruction stored thereon, that when executed by the processor cause the processor to initiate operations including: determining that charging mode has been entered; and generating a command signal to the actuator to create a protrusion on the flexible display in response to determining that charging mode has been entered.

17 Claims, 7 Drawing Sheets

CHARGING A MOBILE DEVICE HAVING A FLEXIBLE DISPLAY

BACKGROUND

The present disclosure relates generally to mobile devices, and more particularly, to charging a mobile device having a flexible display.

Mobile devices (e.g., mobile phones, tablets, etc.) need to be charged periodically. While AC to DC chargers are prominent in the field, such chargers require a user to be at a source of AC power. A variety of self-charging technologies (e.g., solar cells, piezoelectric devices) are known in the art.

BRIEF SUMMARY

Exemplary embodiments include a mobile device comprising a mobile device including a housing; a flexible display positioned in the housing; an actuator coupled to the flexible display; an energy generation device coupled to the flexible display; a battery to receive current from the energy generation device in a charging mode; a processor; and a computer readable medium with computer-executable instruction stored thereon, that when executed by the processor cause the processor to initiate operations including: determining that charging mode has been entered; and generating a command signal to the actuator to create a protrusion on the flexible display in response to determining that charging mode has been entered.

Other exemplary embodiments include a method of operating a mobile device having a flexible display and an energy generation device, the method including: determining that a charging mode has been entered; and in response to charging mode being entered, applying a command signal to an actuator coupled to the flexible display, the actuator forming a protrusion on the flexible display.

Other exemplary embodiments include a computer program product, tangibly embodied on a computer readable medium, for operating a mobile device having a flexible display, the computer program product including instructions that, when executed by a processor, cause the processor to perform operations including: determining that a charging mode has been entered; and in response to charging mode being entered, applying a command signal to an actuator coupled to the flexible display, the actuator forming a protrusion on the flexible display.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
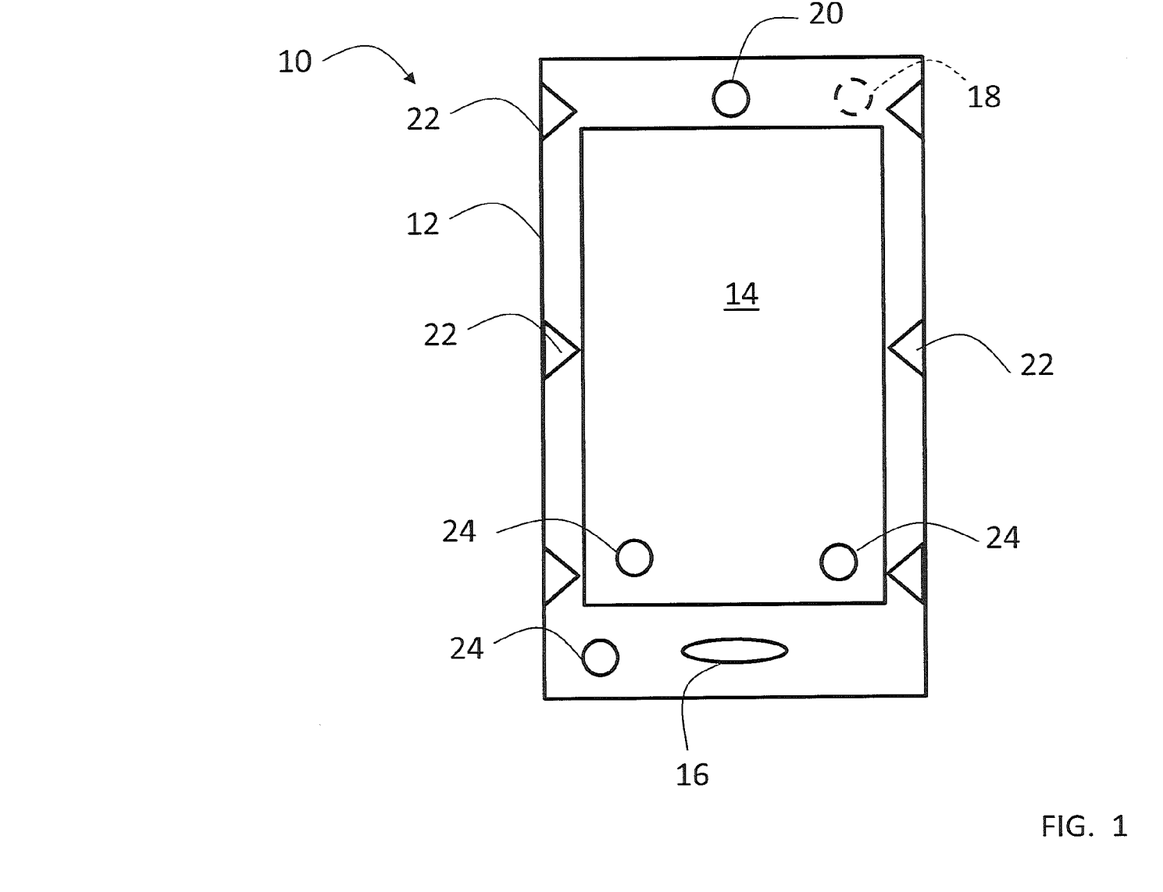
FIG. 1 depicts a mobile device with a flexible display in an exemplary embodiment.

FIG. 1 depicts a mobile device 10 with a flexible display 14 in an exemplary embodiment. Mobile device 10 may be a phone, tablet, personal digital assistant, etc., equipped with communications components (e.g., cellular, wireless LAN, NFC, Bluetooth, USB) for communicating over wireless or wired communications mediums. Mobile device 10 includes a housing 12 that supports flexible display 14. Flexible display 14 may be any known type of flexible display such as a flexible organic light emitting diode (OLED) display of flexible liquid crystal diode (LCD) display.

Mobile device 10 includes a microphone 16. Microphone 16 is used for voice communications and for receiving spoken commands from a user. A camera 18 may be located on a back side of housing 12. A speaker 20 provides audio output to the user. Mobile device 10 also includes one or more buttons 24 for controlling the device. Buttons 24 may be permanent components built into housing 12 or may be virtual buttons, presented on flexible display 14, activated by touching flexible display 14. One or more sensors 22 are positioned on housing 12 to sense various parameters such as contact, temperature, motion, etc.

Figure 2:
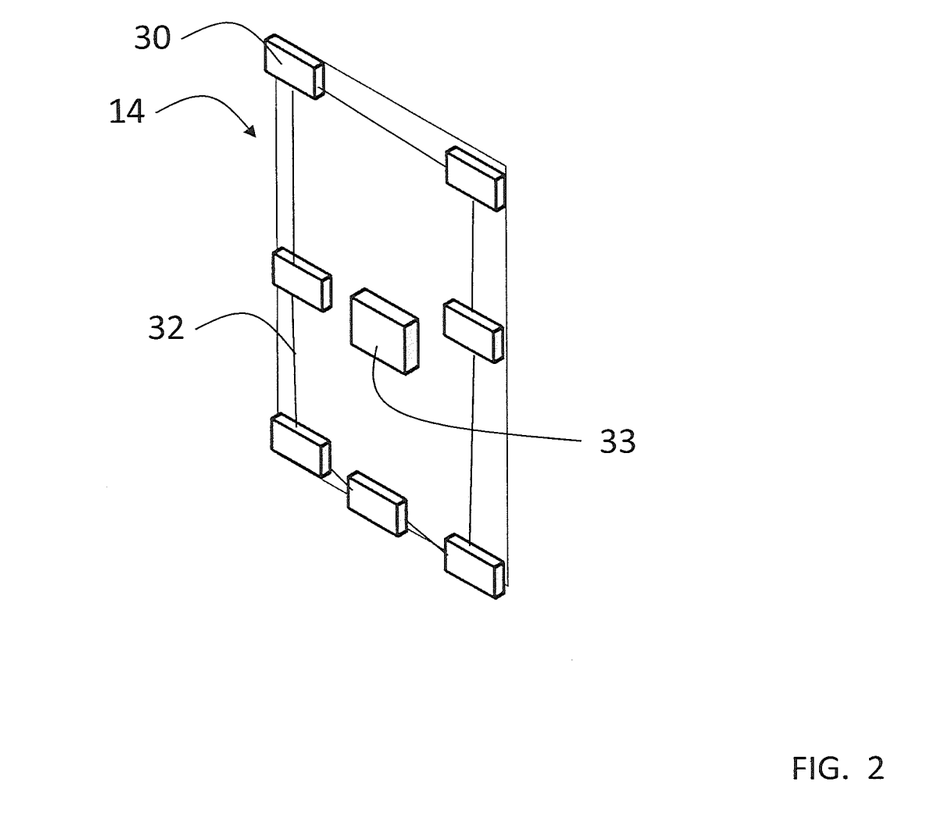
FIG. 2 depicts a flexible display in an exemplary embodiment.

FIG. 2 depicts a flexible display 14 in an exemplary embodiment. A plurality of actuators 30 are positioned on a back side of flexible display 14. Actuators 30 may be implemented using known force transmitting devices (e.g., electromagnetic, pneumatic, hydraulic, electromechanical, etc.). Actuators 30 may also be coupled to other portions of the mobile device 10, such as a housing 12 positioned around flexible display 14. Actuators 30 operate to manipulate the shape of flexible display 14 and/or other components of mobile device 10, in response to command signals from a processor, as described in further detail herein. In exemplary embodiments, actuators 30 include tension wires, which change shape when the appropriate electrical current is applied. Actuators 30 may be interconnected by links 32 (e.g., wires, pins, etc.) to provide support for display shapes. Since the positional arrangement of actuators 30 is known, the necessary command signals required to create a desired display shape can be calculated by a processor.

Also shown in FIG. 2 is an energy generation device 33 that may be mounted on a back side of flexible display 14. Energy generation device 33 converts physical movement of flexible display 14 into an electrical current. More than one energy generation device 33 may be mounted on the back side of flexible display 14. Energy generation devices 33 may be positioned in a pattern corresponding to desired locations of motion of flexible display 14. Energy generation device 33 may be implemented using a piezoelectric member that produces an electrical current upon physical movement of flexible display 14. As described in further detail herein, actuators 30 produce one or more protrusions on flexible display 14 during charging mode. The one or more protrusions control bending of flexible display 14 during charging mode.

Figure 3:
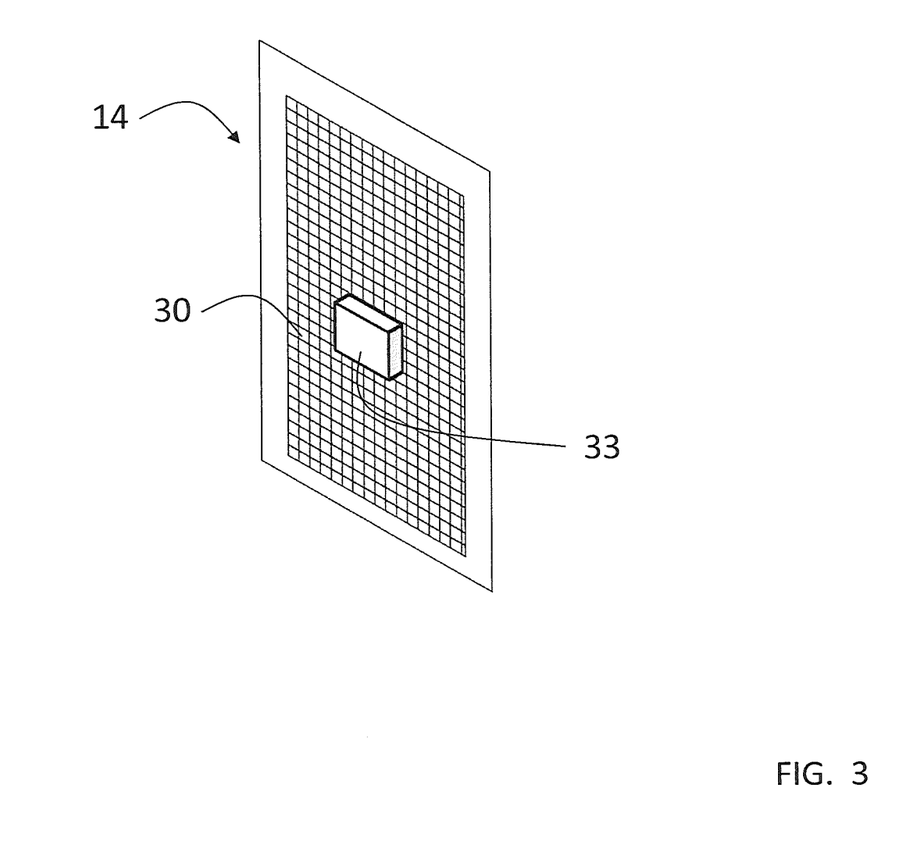
FIG. 3 depicts a flexible display in another exemplary embodiment.

FIG. 3 depicts a flexible display 14 in another exemplary embodiment. In this embodiment, actuator 30 positioned on a back side of flexible display 14 includes a mesh actuator 30. The actuator 30 may include a grid of tension wires, which change shape when the appropriate electrical current is applied. Actuator 30 may also be coupled to other portions of mobile device 10, such as a housing 12 positioned around flexible display 14. Actuator 30 operates to manipulate the shape of flexible display 14 and/or other components of mobile device 10, in response to command signals from a processor, as described in further detail herein.

Also shown in FIG. 3 is an energy generation device 33 that may be mounted on a back side of flexible display 14. Energy generation device 33 converts physical movement of flexible display 14 into an electrical current. More than one energy generation device 33 may be mounted on the back side of flexible display 14. Energy generation devices 33 may be positioned in a pattern corresponding to desired locations of motion of flexible display 14. Energy generation device 33 may be implemented using a piezoelectric member that produces an electrical current upon physical movement of flexible display 14. As described in further detail herein, actuators 30 produce one or more protrusions on flexible display 14 during charging mode. The one or more protrusions control bending of flexible display 14 during charging mode.

Figure 4:
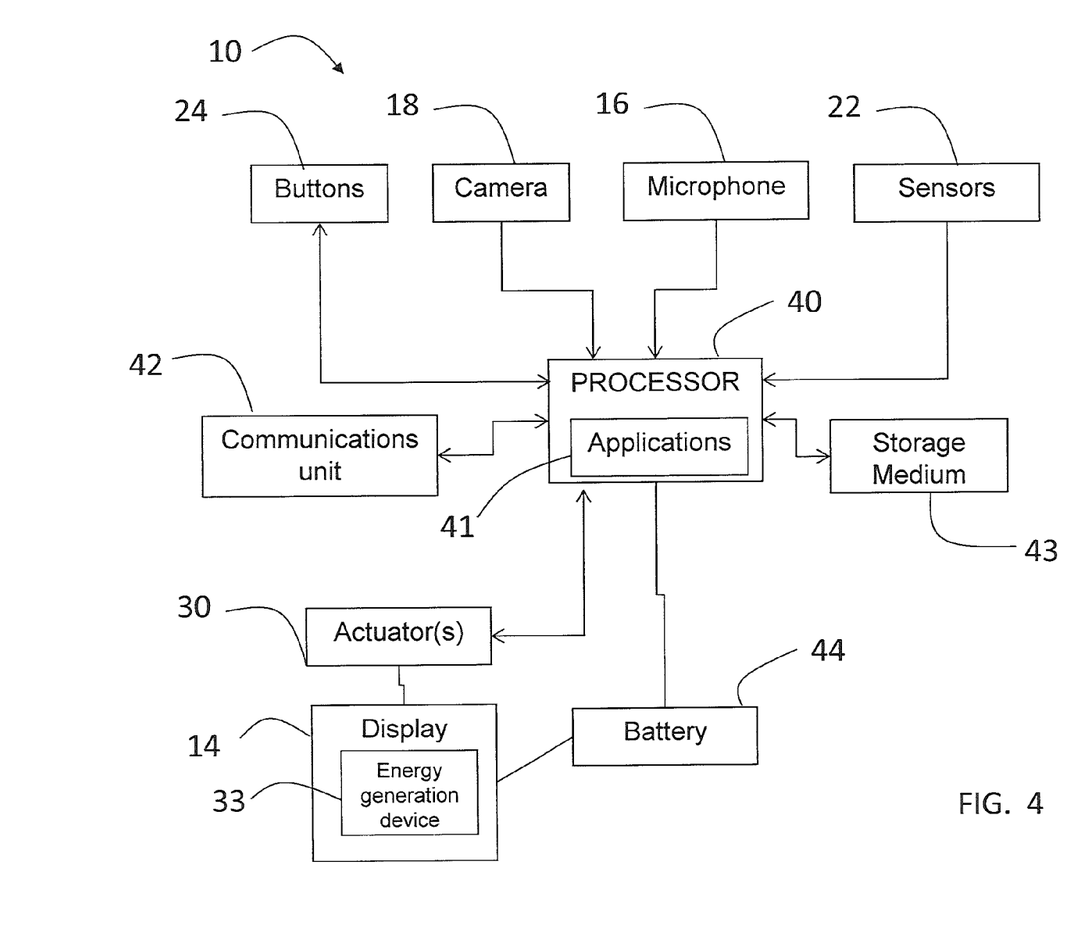
FIG. 4 is a system diagram of a mobile device in an exemplary embodiment.

FIG. 4 is a system diagram of mobile device 10 in an exemplary embodiment. A processor 40 is coupled to buttons 24, camera 18, microphone 16, and sensors 22. Processor 40 may be implemented using a general-purpose microprocessor executing a computer program stored in a computer readable storage medium 43 to execute the processes described herein. Processor 40 is also coupled to a communications unit 42 that handles communications between the mobile device 10 and other devices, such as cellular phone calls, NFC communications, Bluetooth, etc. Processor 40 may also execute a number of applications 41 that manipulate a shape of flexible display 14 during charging mode. Processor 40 also receives status signals from actuators 30 identifying a current position of flexible display 14. Based on the various inputs, processor 40 generates command signals to one or more actuators 30 to manipulate a shape of flexible display 14 during charging mode. A battery 44 is charged by current from energy generation device 33 on flexible display 14. Processor 40 may monitor state of charge of battery 44 and generate a prompt on flexible display 14 that charging mode should be entered.

Figure 5A:
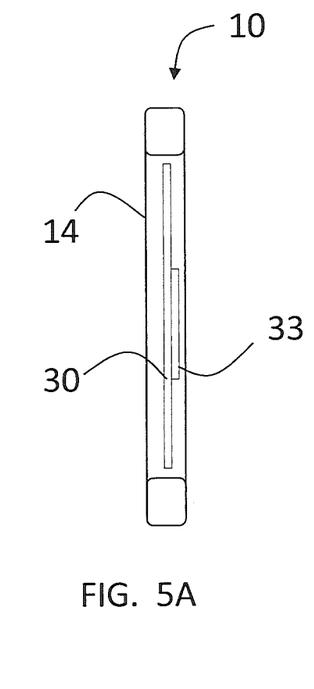
FIGS. 5A-5D illustrate bending of a mobile device in charging mode in an exemplary embodiment.
Figures 5B, 5C:
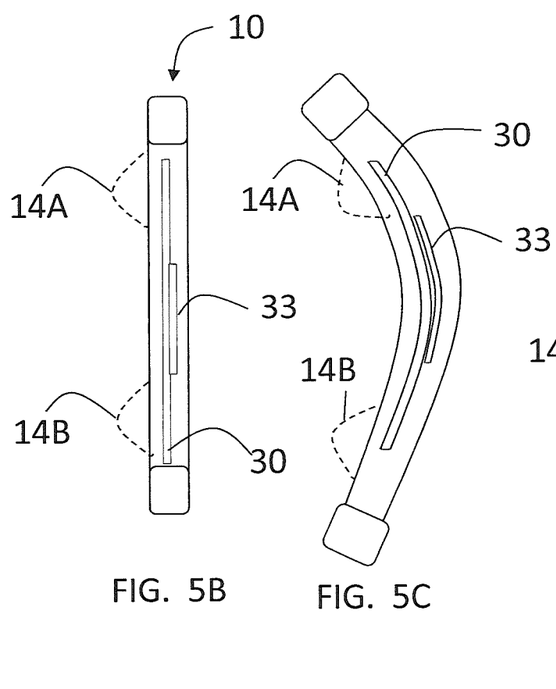

FIGS. 5A-5D illustrate an example of manipulating flexible display 14 during charging mode. As shown in FIG. 5A, actuator 30 of mobile device 10 may be a mesh actuator positioned on the back of flexible display 14. Energy generation device 33 is mounted in mobile device 10 to move with flexible display 14. When processor 40 determines that charging mode is entered, command signals are provided to actuator 30 to manipulate flexible display 14 to form a protrusion 14A at a first position of flexible display 14 and a protrusion 14B at a second position of flexible display 14, as shown in FIG. 5B.

As shown in FIG. 5C, the mobile device 10 is being bent to impart physical motion to energy generation device 33 to charge battery 44. In one example, the ends of the mobile device 10 are bent towards each other to bend energy generation device 33 and produce a current. Flexible screen 14 is bent repeatedly back and forth. Protrusions 14A and 14B on flexible display 14 serve to focus movement of the flexible display 14 at a location corresponding to the energy generation device 33. Protrusions 14A and 14B on flexible display 14 may be formed to limit deformation of flexible screen 14 at locations proximate to protrusions 14A and 14B. For example, protrusions 14A and 14B may include one or more ribs or ridges that resist bending, so that the bending motion is focused at energy generation device 33.

Figure 5D:
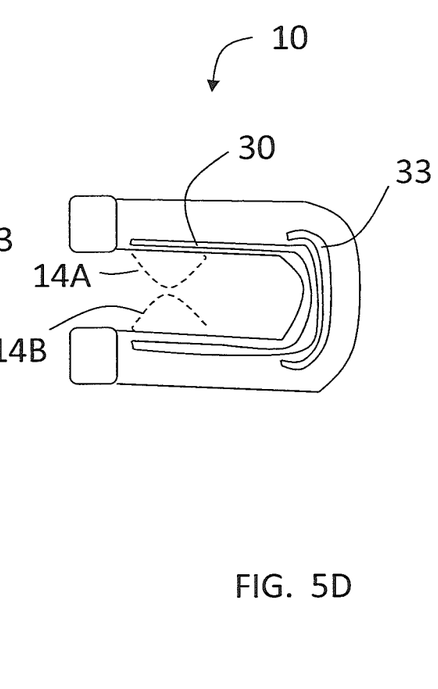

As bending of mobile device 10 continues, protrusions 14A and 14B serve to limit the range of motion of flexible display 14. As illustrated in FIG. 5D, as flexible screen 14 is bent further, protrusions 14A and 14B contact each other to limit further bending. This protects both flexible screen 14 and energy generation device 33 from exceeding a bend radius limit that could result in damage to flexible screen 14 and/or energy generation device 33.

The example of FIGS. 5A-5D illustrate protrusions 14A and 14B on a single side of flexible display 14. It is understood that flexible display 14 may be double sided. In such embodiments, both sides of flexible display 14 may be manipulated by actuator 30 to form one or more protrusions on both sides of flexible display 14 to focus bending at energy generation device 33 and limit the range of motion of flexible display 14.

Figure 6:
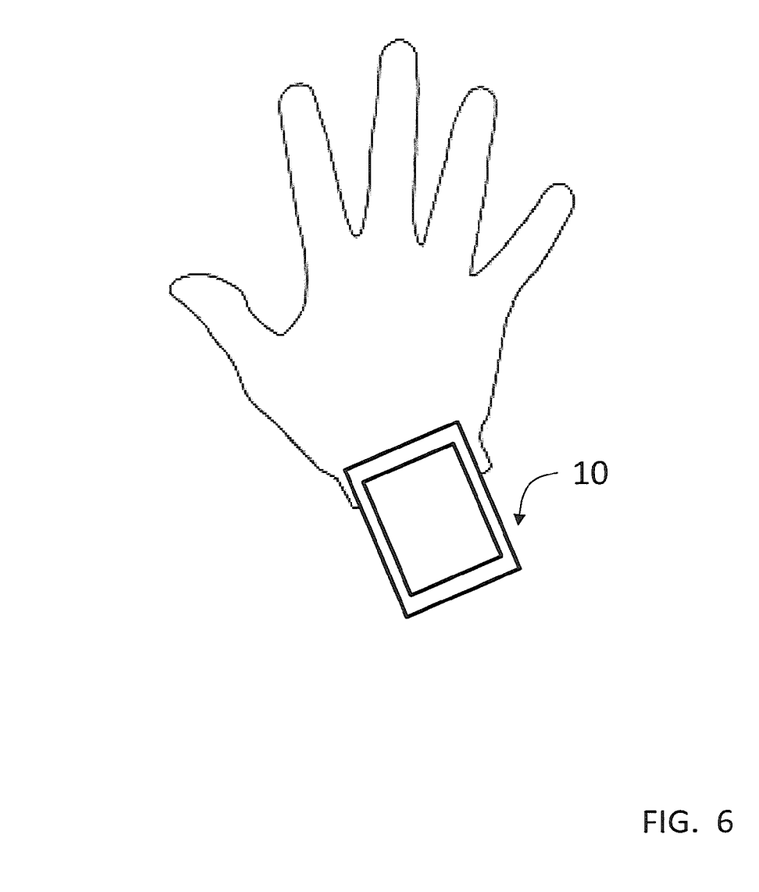
FIG. 6 depicts wearing a mobile device in another exemplary embodiment.

FIG. 6 illustrates an example of mobile device 10 being worn on part of a human body. In the example of FIG. 6, mobile device 10 is worn on the wrist. Charging mode may involve the wearer bending their wrist to impart motion to flexible display 14 and energy generation device 33. During charging mode, processor 40 controls actuator 30 to manipulate flexible screen 14 so as to comply with anatomical motion of the body part where mobile device 10 is located. In the example of FIG. 6, flexible screen 14 is manipulated by actuator 30 to form one or more protrusions on flexible screen 14 that allow bending of flexible screen 14 consistent with the anatomical motion of the wearer's wrist. This ensures that flexible screen 14 allows motion to bend energy generation device 33 consistent with the anatomical motion where the mobile device 10 is worn. The wrist location is just one example, and it is understood that mobile device 10 may be worn at other body locations (e.g., knee) with one or more protrusions formed on flexible display 14 consistent with the anatomical motion of the body location.

Figure 7:
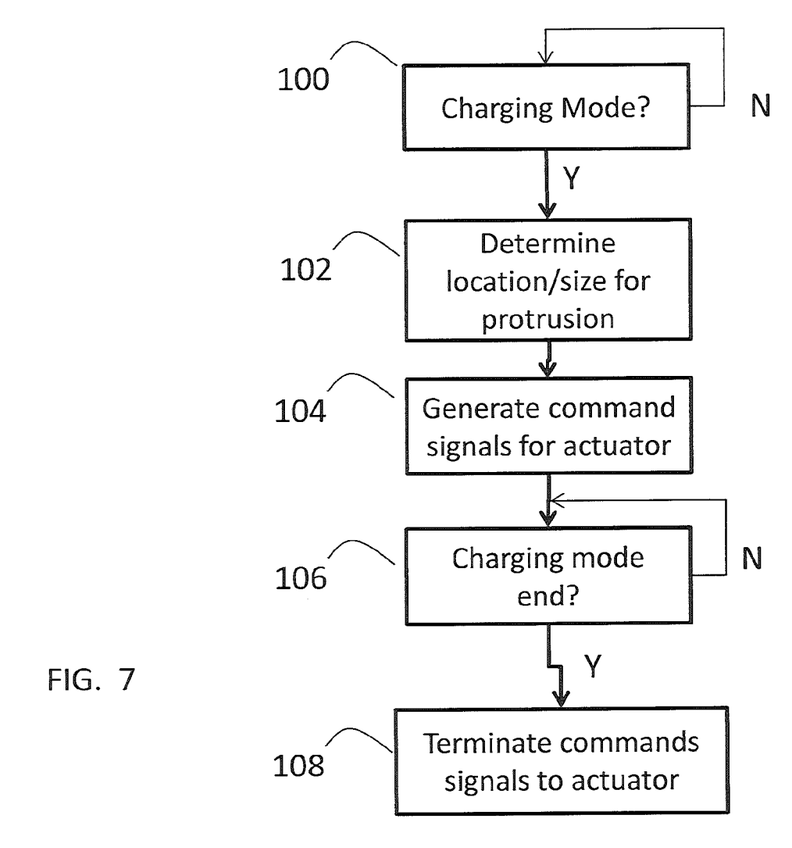
FIG. 7 is a flowchart of a process for manipulating a flexible display in an exemplary embodiment.

FIG. 7 is a flowchart of a process for implementing a charging mode in an exemplary embodiment. The process may be implemented by processor 40 in response to computer program code stored in storage medium 43. The process begins at 100 where processor 40 determines if charging mode has been entered. Processor 40 may monitor state of charge of battery 44 and notify the user that charging is needed. The user may then place mobile device 10 in charging mode through an input.

Upon entering charging mode, at 102, processor 40 determines how to manipulate flexible display 14 to form one or more protrusions on one or both surfaces of flexible display 14. Processor 40 determines where to form the one or more protrusions, the size of the one or more protrusions, etc., based on a variety of factors. The location of energy generation device 33 may contribute to determining where the one or more protrusions are formed. Limits on the range of motion of flexible display 14 may contribute to where the one or more protrusions are formed. Further, if the mobile device is worn on the human body, the location and orientation of the mobile device may contribute to where the one or more protrusions are formed. Storage medium 43 may be preprogrammed to identity where to form the one or more protrusions, the size of the one or more protrusions, etc. based on mobile device 10 as manufactured.

At 104, processor 40 generates one or more command signals to actuator(s) 30 to create the one or more protrusions on flexible screen 14. The user can then manipulate flexible display 14 to cause physical movement of energy generation device 33. Energy generation device 33 produces a current to charge battery 44. At 106, processor 40 determines if charging mode has ceased. End of charging mode may be determined based on an input from the user or a detection through one or more sensors 22 that manipulation of the flexible screen 14 has ceased.

When charging mode ends at 106, flow proceeds to 108 where the process is terminated, and processor 40 returns flexible screen 14 to a planar state by terminating the command signals to actuator 30.

As described above, the exemplary embodiments can be in the form of processor-implemented processes and devices for practicing those processes, such as processor 40. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A mobile device comprising:
a housing;
a flexible display positioned in the housing;
an actuator coupled to the flexible display;
an energy generation device coupled to the flexible display;
a battery to receive current from the energy generation device in a charging mode;
a processor; and
a computer readable medium with computer-executable instruction stored thereon, that when executed by the processor cause the processor to initiate operations including:
determining that charging mode has been entered; and
generating a command signal to the actuator to create a protrusion on the flexible display in response to determining that charging mode has been entered.

2. The mobile device of claim 1 wherein:
the energy generation device is a piezoelectric device.

3. The mobile device of claim 1 wherein:
the protrusion on the flexible display focuses bending of the flexible display to a region corresponding to the energy generation device.

4. The mobile device of claim 1 wherein:
the protrusion on the flexible display limits bending of the flexible display.

5. The mobile device of claim 1 wherein:
the protrusion on the flexible display focuses bending of the flexible display to a region corresponding to the energy generation device and limits bending of the flexible display.

6. The mobile device of claim 1 wherein:
the protrusion includes a first protrusion and a second protrusion, the first protrusion and second protrusion positioned on the flexible display;
wherein the first protrusion and the second protrusion are positioned to contact each other to limit bending of the flexible display.

7. The mobile device of claim 1 wherein:
the protrusion is positioned on the flexible display in response to a location where the housing is to be positioned relative to a wearer.

8. A method of operating a mobile device having a flexible display and an energy generation device, the method comprising:
determining that a charging mode has been entered; and
in response to charging mode being entered, applying a command signal to an actuator coupled to the flexible display, the actuator forming a protrusion on the flexible display.

9. The method of claim 8 wherein:
the protrusion on the flexible display focuses bending of the flexible display to a region corresponding to the energy generation device.

10. The method of claim 8 wherein:
the protrusion on the flexible display limits bending of the flexible display.

11. The method of claim 8 wherein:
the protrusion on the flexible display focuses bending of the flexible display to a region corresponding to the energy generation device and limits bending of the flexible display.

12. The method of claim 8 wherein:
the protrusion includes a first protrusion and a second protrusion, the first protrusion and second protrusion positioned on the flexible display;
wherein the first protrusion and the second protrusion are positioned to contact each other to limit bending of the flexible display.

13. A computer program product, tangibly embodied on a computer readable medium, for operating a mobile device having a flexible display, the computer program product including instructions that, when executed by a processor, cause the processor to perform operations comprising:
determining that a charging mode has been entered; and
in response to charging mode being entered, applying a command signal to an actuator coupled to the flexible display, the actuator forming a protrusion on the flexible display.

14. The computer program product of claim 13 wherein:
the protrusion on the flexible display focuses bending of the flexible display to a region corresponding to the energy generation device.

15. The computer program product of claim 13 wherein:
the protrusion on the flexible display limits bending of the flexible display.

16. The computer program product of claim 13 wherein:
the protrusion on the flexible display focuses bending of the flexible display to a region corresponding to the energy generation device and limits bending of the flexible display.

17. The computer program product of claim 13 wherein:
the protrusion includes a first protrusion and a second protrusion, the first protrusion and second protrusion positioned on the flexible display;
wherein the first protrusion and the second protrusion are positioned to contact each other to limit bending of the flexible display.

* * * * *